US011946462B2

(12) United States Patent
Tvaruzek et al.

(10) Patent No.: US 11,946,462 B2

(45) Date of Patent: Apr. 2, 2024

(54) HYDRAULIC AXIAL PISTON UNIT AND METHOD FOR CONTROLLING OF A HYDRAULIC AXIAL PISTON UNIT

(71) Applicant: Danfoss Power Solutions Inc., Ames, IA (US)

(72) Inventors: Jaromir Tvaruzek, Ames, IA (US); Samuel Hall, Ames, IA (US); Phil Evans, Ames, IA (US); Dennis Greene, Ames, IA (US)

(73) Assignee: DANFOSS POWER SOLUTIONS, INC., Ames, IA (US)

( * ) Notice: Subject to any disclaimer, the term of this patent is extended or adjusted under 35 U.S.C. 154(b) by 902 days.

(21) Appl. No.: 16/700,407

(22) Filed: Dec. 2, 2019

(65) Prior Publication Data

US 2021/0164501 A1 Jun. 3, 2021

(51) Int. Cl.

| | |
|---|---|
| ***F04B 1/26*** | (2006.01) |
| ***F01B 3/00*** | (2006.01) |
| ***F04B 1/30*** | (2020.01) |
| ***F04B 1/34*** | (2006.01) |
| *F04B 1/20* | (2020.01) |
| *F04B 49/00* | (2006.01) |
| *F04B 49/12* | (2006.01) |

(52) U.S. Cl.

CPC .............. *F04B 1/26* (2013.01); *F01B 3/0058* (2013.01); *F04B 1/30* (2013.01); *F04B 1/34* (2013.01); *F04B 1/20* (2013.01); *F04B 49/002* (2013.01); *F04B 49/12* (2013.01); *F15B 2211/41536* (2013.01)

(58) Field of Classification Search

CPC .. F01B 3/0058; F01B 1/02; F04B 1/26; F04B 1/30; F04B 1/34; F04B 19/025

See application file for complete search history.

(56) References Cited

U.S. PATENT DOCUMENTS

| | | | | |
|---|---|---|---|---|
| 3,199,461 A * | 8/1965 | Wolf | ..................... | F04B 1/0452 91/506 |
| 3,956,969 A * | 5/1976 | Hein | ..................... | F04B 1/2042 91/487 |
| 4,918,918 A * | 4/1990 | Miki | ....................... | F04B 1/324 60/489 |

(Continued)

*Primary Examiner* — Nathan C Zollinger

*Assistant Examiner* — Timothy P Solak

(74) *Attorney, Agent, or Firm* — McCormick, Paulding & Huber PLLC

(57) ABSTRACT

Hydraulic axial piston unit having a rotational group for driving or being driven by a driving shaft, and a tiltable displacement element for adjusting the displacement volume of the rotational group. The rotational group includes a rotatable cylinder block in which working pistons are mounted reciprocally moveable in cylinder bores for conveying hydraulic fluid from an inlet port to an outlet port on a valve segment. At least two control ports are located on the valve segment each between the inlet port and the outlet port. The control ports can be brought sequentially in fluid connection with the cylinder bores when the cylinder block is rotating. At least one hydraulic fluid injector is connected fluidly to one control port, for sequentially injecting pressurized hydraulic fluid via the control port into the passing cylinder bores. Via the other control port hydraulic fluid can be drained from passing cylinder bores.

19 Claims, 8 Drawing Sheets

(56) References Cited

U.S. PATENT DOCUMENTS

| | | | | |
|---|---|---|---|---|
| 5,554,007 A * | 9/1996 | Watts | F04B 1/324 | 91/504 |
| 6,442,934 B1 * | 9/2002 | Okuda | F16H 61/468 | 60/451 |
| 6,510,779 B2 * | 1/2003 | Greene | F04B 49/002 | 417/270 |
| 6,736,048 B2 * | 5/2004 | Riedhammer | F04B 1/2042 | 417/269 |

* cited by examiner

HYDRAULIC AXIAL PISTON UNIT AND METHOD FOR CONTROLLING OF A HYDRAULIC AXIAL PISTON UNIT

TECHNICAL FIELD

The present invention relates to hydraulic axial piston units and a method for controlling hydraulic axial piston units. The inventive idea is directed to hydraulic axial piston units of the swashplate type as well as hydraulic axial piston units of the bent-axis type of construction and provides a method for controlling both types. The hydraulic axial piston units to which the invention refers to can be used in open hydraulic circuits as well as in closed hydraulic circuits.

BACKGROUND

Such hydraulic axial piston units are widely known in the state of the art and are used as variable displacements units, as two-position units or as constant units. All of them can be operated in pumping or motoring mode. Hydraulic axial piston units are widely used in the art as they show a high power density especially at high pressure levels for transmitting mechanical torques or for generating (pressurized) fluid flow. Furthermore hydraulic axial piston units can be controlled in their displacement volume by means of changing the tilt angle of the displacement element, i.e. the swashplate or the yoke angle. In order to transform mechanical energy into hydraulic power and vice versa, i.e. hydraulic power to mechanical energy, hydraulic axial piston units comprise a rotational group. This rotational group has a rotatable cylinder block in which working pistons are mounted reciprocally movable for conveying hydraulic fluid from a kidney-shaped inlet port to a kidney-shaped outlet port located on a valve segment of the hydraulic axial piston unit. When, in case of a swashplate hydraulic axial piston unit the normal vector of the running surface of the swashplate axis, or in case of a bent-axis hydraulic axial piston unit the rotational axis of the cylinder block do not coincide with the drive shaft axis, the working pistons are forced to a reciprocate movement, i.e. to a stroke of the working pistons between their upper dead centre and their bottom dead centre, when the cylinder block is turning. Thereby hydraulic fluid is conveyed from the inlet port to the outlet port due to this reciprocate movement of the working pistons. As known, one of the inlet port or the outlet port is serving as a high pressure port and the respective other port serves as a low pressure port, wherein the correlation which port serves as high pressure port and which serves as low pressure port depends on the operational mode of the hydraulic unit and the conveying direction. As commonly known, the displacement volume can be changed by varying the tilt or the bent angle, respectively.

In operation of a hydraulic axial piston unit the performance of the hydraulic axial piston unit is determined by the product of pressure difference between the low pressure level and the high pressure level and the flow rate through the hydraulic axial piston unit. For adjusting the performance of such a hydraulic axial piston unit manual, hydraulic or electronic controlled displacement units are used, which often work together with servo units to set/adjust the displacement volume of the hydraulic axial piston unit. These controls are usually complex due to its high level of demand in manufacturing and operation precision. Thus, they are costly in its manufacturing and installation work. Furthermore, the control and servo units of the state of the art—due their amount of parts—are bulky and space consuming so that the overall size of hydraulic axial piston units is negatively influenced by the used control system. Further, the known controls of hydraulic axial piston units are developed for specific applications and require for each and every application specific adapted control parts, like specific suitable adapted valve plates and/or valve segments as well as specifically adapted servo and control spools and springs, which furthermore require narrow tolerances. These specific control parts are exposed furthermore to wear and therefore need maintenance or replacement for time to time. Furthermore these specific control parts are not suitable to be changed on the fly, i.e. once installed they cannot be adapted to individual load situations, and moreover they often cannot be used in different hydraulic axial piston units of different volumetric size or even used for hydraulic axial piston units of different type of construction, like swashplate units or bent axis units.

SUMMARY

Hence, it is object of the present invention to provide a control system for hydraulic axial piston units which is less bulky, less costly and provides at least the same level of precision for controlling hydraulic axial piston units. Further the inventive control system should be applicable in hydraulic axial piston units of the swashplate and the bent axis type of construction. One control system according to the invention should be suitable for different hydraulic axial piston units, e.g., of different volumetric sizes. Thereby the control system should be adjustable on the fly for different load situations or different applications, like propel drive, load lifting, drilling drives, or work vehicles in general. The invention should provide a control system which can be used flexibly for a great variety of hydraulic axial piston units, e.g. as standard control system applicable to a plurality of hydraulic axial piston units without the necessity of a specific adaptation to one single hydraulic axial piston unit. Moreover the control should be reliable in operation and should comprise a reduced number of parts for performing the control of hydraulic axial piston units. Furthermore the control system should improve the running of the hydraulic units as well as reducing noises and wear of the involved components during operation.

The object is solved by a hydraulic axial piston unit as described herein, having a rotational group for driving or being driven by a driving shaft. A displacement element for changing/adjusting the displacement volume of the rotational group can be tilted with respect to the driving shaft axis of the driving shaft. In general, the displacement element can be tilted between a first end position and a second end position defining maximum, minimum or zero displacement volume. The rotational group further comprises a rotatable cylinder block in which working pistons are mounted reciprocally moveable in cylinder bores for conveying hydraulic fluid from a kidney-shaped inlet port to a kidney-shaped outlet port located on a valve segment. These two kidney-shaped ports are angularly, i.e. in circumferential direction spaced from each other, wherein one kidney-shaped port in operation of the hydraulic axial piston unit is used as a high pressure port and the respective other one is used as a low pressure port. According to the invention, two control ports are located on the valve segment, each of which is located in one of the two areas between the angularly spaced kidney-shaped inlet port and kidney-shaped outlet port, or in other words, between the circumferential ends of the two kidney-shaped ports provided as inlet and outlet ports. The control ports are thereby situated on the valve segment such that a fluid connection between the control ports and a passing cylinder bore is enabled at that position where the stroke of the reciprocating pistons in this cylinder bore is nearby or at one of its dead centre position. When the cylinder block is turning cylinder bores are brought sequentially in fluid connection with one of the two control bores. According to the invention hydraulic fluid can be injected via one of the control bores into the corresponding cylinder bore by means of a hydraulic fluid injector. Via the other control port hydraulic fluid can be drained from a different cylinder bore passing this control port. Thus, by means of the hydraulic fluid injector the hydraulic fluid volume in one cylinder bore can be increased, while the hydraulic fluid volume in another cylinder bore can be decreased achieving thereby a change in stroke of the working pistons, and therewith obtaining a change of the displacement volume of the hydraulic axial piston unit as the tilt, respectively, the swashplate angle is changed by modifying the stroke of the working pistons.

Hydraulic fluid injectors according to the invention are devices which are capable to enable that hydraulic fluid enters into or exits from a cylinder bore when the hydraulic axial piston unit is in operation. Hence the hydraulic fluid injectors can be denominated as well as quick reacting switching valves to which pressurized hydraulic fluid from a pressure source is supplied. By means of controlling the point of time of opening and closing the injector/quick reacting switching valve the injection to a cylinder bore and the draining from a cylinder bore is performed. In the following these quick reacting switching valves are called injectors, as normally the injection of hydraulic fluid into a cylinder bore is used to actively control the displacement volume of the hydraulic axial piston units, whereas the draining step is caused by the change of the tilt, respectively the swashplate angle. This means also that the amount of hydraulic fluid injected into one cylinder bore at one control bore has to be drained from another cylinder bore at the other control port. Hence the injectors according to the invention are bi-directional quick reacting switching valves capable to enable that hydraulic fluid enters a cylinder bore or exits from a cylinder bore. Hydraulic fluid injectors according to the invention can hence be similar to the type used in the automotive industry as fuel injectors, however, fuel injectors need not to be bi-directional. Even though hydraulic fluid injectors according to invention do not have to be bidirectional for every application a skilled person can think about, in cases on-stroke and de-stroke control is required the hydraulic fluid injectors according to the invention preferably are bi-directional for enabling injection and drainage by one single injector.

According to the invention hydraulic fluid can be injected/drained over the whole time span an overlap of a cylinder bore with a control port is present while the cylinder block is in motion. During this time span of partial or whole overlap hydraulic fluid can be injected or drained over the whole time span or only partially or sequenced or in any other timely manner, depending on which change of displacement volume should be achieved. In general, the bigger the amount of hydraulic fluid injected at one control port the bigger the change of the angle of tilt and therefore the change in displacement volume of the hydraulic axial piston unit.

A person with relevant skills in the art derives from that the inventive control method provides for a flexible control of the angle of tilt and hence the displacement volume of the hydraulic axial piston unit as the point of time for injection/drainage as well its duration and the height of the injection pressure and therewith the amount of injected hydraulic fluid can be flexibly selected in order to achieve the desired tilt angle change and/or improvement in running behaviour of the hydraulic axial piston unit. A person with relevant skills in the art also derives that with the inventive control device and control method it is possible to vary the cylinder bore volume when the cylinder bore passes the injection control port. For example looking at a cylinder bore in which the working piston is at its top dead centre when passing the control port, a hydraulic fluid injection before top dead centre reduces the stroke of the working piston as the injected hydraulic fluid counteracts against the working piston motion. Accordingly an injection in the same cylinder bore after top dead centre of the working piston increases the stroke of the working piston, as the hydraulic fluid injection accelerates the working piston motion. An analogous analogy is valid when looking to the other control port where the working piston is around its low dead centre. Here injecting before lower dead centre provokes an on-stroking and an injection after lower dead centre causes a de-stroking as the working piston is counteracted in its motion by the injected hydraulic fluid. By the help of the inventive arrangement of injectors at the two control ports a flexible timing for injection and drainage is possible and therefore an exact an effective control of a hydraulic axial piston unit can be obtained.

As the injection of hydraulic fluid into a cylinder bore is the preferred step for performing the control of a hydraulic axial piston unit according to the invention, the focus of the further explanations is drawn on that injection step, however a person with relevant skills in the art derives from the above that the amount of injected hydraulic fluid at one control port to be drained at the other control port, can also be used for performing the control of the hydraulic axial piston units. Here in an analogous way, when draining is the leading control step, injection of hydraulic fluid at the other control port should compensate the drained amount of hydraulic fluid.

The "injection pressure" for performing/triggering the inventive control can be provided/supplied by the system pressure or the working pressure, respectively, or can be provided/supplied by an additional pressure source, e.g., a separate pump. In most cases system pressure would be sufficient for performing the inventive control of the displacement of a hydraulic axial piston unit, as the point of time on which injection can be performed for changing the displacement or running behaviour is around the moment when of the working pistons is approximately at one of its two dead centres of the stroke, i.e. when a cylinder bore is at least in partial overlap with one of the control ports. This means that the pressure inside in the cylinder bore cannot be higher than the system pressure. Hence, in general, system pressure is sufficient for performing the displacement control according to the invention. In general, the injection of hydraulic fluid according to the invention can be performed as long as an at least partial overlap between the cylinder bore and the control port exists.

For creating the injection pressure an additional pump can be used, like the systems charge pump in case the inventive hydraulic axial piston unit is operated in a closed hydraulic circuit. However, any other additional pressure source providing sufficient high hydraulic pressure can be used in the sense of the invention, e.g., an external or internal gear pump or a hydraulic accumulator.

By means of selecting the point of time at which injection occurs in the available time window between the commencement of overlap of the cylinder bore orifice and the control port until this overlap terminates enables to inject flexibly in a controlled manner the amount of hydraulic fluid in the cylinder bore(s). By applying the inventive control method injection of hydraulic fluid in the cylinder bore(s) can take place on, before or after the working piston in the correspondent cylinder bore is at its respective dead centre. However all variations of when injection should occur imaginable by a person with relevant skills in the art are covered by the inventive idea, as well as pressure variation during the injection process. Also two- or multitimes injection into a cylinder bore during its passing over of the control port is within the possibilities the inventive control unit and the inventive control method provides for.

In the sense of the present invention the term valve segment refers to that part of a hydraulic axial piston unit, where the kidney-shaped ports are located on, and from where hydraulic fluid is conveyed to and from the cylinder bores of the cylinder block. The valve segment is stationary with respect to the cylinder block. This can be achieved in case of a swashplate hydraulic axial piston unit with a separate valve plate which can also be integrated into the casing or the end cap of the swashplate unit, for example. In case of a bent-axis unit the valve segment is frequently attached to or integrated into the yoke, the displacement element of such a hydraulic axial piston unit of the bent-axis type of construction. In both cases the valve segment acts thereby as a kind of distributor for separating the high pressure side from the low pressure side in all possible operational modes of a hydraulic machine.

According to the invention at least one hydraulic fluid injector is connected fluidly to one control port and for sequentially injecting pressurized hydraulic fluid via the associated control port into the cylinder bore passing the control port when the cylinder block turns. By means of injecting pressurized hydraulic fluid into the cylinder bore, the pressure in the corresponding cylinder bore can be raised or lowered in a controlled manner. In the sense of the invention, the point in time at which injection is executed is then, when the stroke of the working piston in the cylinder bore is approximately at its upper or bottom dead centre, means that injection can start some time before or after the working piston is at its dead end. Analogous injection can stop sometime before or after the working piston passes its dead centre.

By means of injecting pressurized hydraulic fluid into the cylinder bores with a higher pressure level than the pressure present in the cylinder bore passing the control port, e.g. injecting with system or working pressure level, an (additional) hydraulic force is generated on the bottom part of the working piston. This hydraulic force is transmitted (mechanically) onto the displacement element causing it to change its angled position, in order to enable the increase in volume of the hydraulic fluid inside the cylinder bore. This increase in volume is synonymous to a change of the displacement volume as the tilt angle or the bent angle, respectively, of the displacement element is changed. In other words, the injection of hydraulic fluid through one of the control ports generates a hydraulic force, which moves the displacement element into a new angled position causing the hydraulic axial piston unit to a new displacement volume.

By means of controlling the injection time, the pressure level and the amount of hydraulic fluid injected the additional pressure force acting on the working piston for controlling the displacement volume and the running behaviour of the hydraulic axial piston unit can be set/adjusted appropriately. Hence by controlling the injection parameters, in particular the point of time and duration of injection, the tilt or bent angle of the displacement element can be adjusted. According to the height of the injection pressure level, the timing of injection start and end, and the amount of hydraulic fluid injected into the cylinder bore, the working piston within the respective cylinder bore is forced to a certain position. Thereby the stroke of the working pistons is controllable by the inventive pressure fluid injection.

According to the invention, in order to enable the change of stroke of the working pistons, and to enable the correspondent adjustment of the tilt angle of the displacement element and therewith the adjustment of the displacement volume, hydraulic fluid under an injection pressure higher than the correspondent cylinder bore pressure—which is maximum system pressure level—has to be injected in the cylinder bores passing one of the control ports. Simultaneously via the other control port hydraulic fluid has to be drained from the cylinder bores at the respective working piston's stroke opposite dead centre, i.e. spaced angularly 180° on the valve segment. Here the amount of hydraulic fluid drained from the opposite port is in general the same, when compressibility of the hydraulic fluid and leakages between the valve plate and cylinder block are not taken into account. Thus it is possible to establish a fluid connection between the two control ports such that the hydraulic fluid drained on the "draining" control port can be used again in one of the following control injections at the other control port, i.e. the "injection" control port.

In a further embodiment at least one bypass line is provided connecting one control port with the adjacent kidney-shaped inlet or outlet port upstream or downstream of the control port. By doing this the pressure step between the pressure level at the control port and the pressure level present in the kidney-shaped inlet or outlet port can be smoothened and the running behaviour of the hydraulic axial piston unit is improved. Thereby it is preferred to arrange an orifice into this bypass line, in order to reduce the pressure level entering the bypass line at the control port or the kidney-shaped inlet or outlet port.

In a further embodiment this bypass line can be used as the draining line according to the invention, when the bypass line is connected to the low-pressure kidney-shaped inlet or outlet port. This is preferred, e.g. for uni-directional rotating hydraulic axial piston units, in which the high pressure side does not interchange with the low pressure side. Also here each of the two control ports can be connected via such a bypass line to one of the kidney-shaped inlet or outlet port upstream or downstream of the respective control port.

According to the invention the injection pressure to provoke a change in stroke of the working piston is provided/supplied by an injection pressure source capable to provide a pressure level above the pressure level present in the cylinder bore into which hydraulic fluid is to be injected. Usually the pressure level of the system is sufficient as the point of time for injection can be before, at or after the point of time when the corresponding working piston is at its respective dead centre, meaning that the maximum bore pressure level is system pressure level. Hence when the inventive injection of hydraulic fluid starts, continues or ends just at the moment when the working piston is at its dead centre the pressure levels inside the cylinder bore and at the control port are balanced and no fluid flow via the control port occurs in this case. If, according to the invention fluid flow through the control port into the cylinder bore is needed when the working piston is at its dead centre, for instance for hydraulic axial piston units in neutral start position not showing any displacement volume and at system pressure zero, an additional pressure source is needed. This can be, e.g. the systems charge pump or any other external pressure source. In latter case only an "activation injection is needed to start the hydraulic axial piston unit running, as, when the hydraulic axial piston unit is running system pressure can be used for further inventive controlling of the displacement volume or the running behaviour.

In all cases the amount of hydraulic fluid injected is relatively low and cannot be more than the half of the theoretical maximum stroke volume of one working piston. Hence it is imaginable to use, if necessary, e.g. when system pressure is not present, any kind of device for creating hydraulic pressure, e.g., a gear pump, a vane pump, a piston pump, a piston-cylinder device, or the like, as an injection pressure source. It is also imaginable to use the systems charge pump for this purpose, or, vice versa, to use the injection pump as charge pump for the system.

Further, according to the invention, a servo unit in particular, is no longer necessary as by means of inventive injection control system the angle of tilt of the displacement element can be maintained or changed pursuant to an operator command or a control unit commanding by means of injecting hydraulic fluid under injection pressure into the cylinder bores passing one of the control ports. By doing this, the response time of the inventive injection control system, e.g., to an operator command or a load sensing signal will be much quicker as compared to the state of the art, having, e.g. servo controls for adjusting the displacement volume, as the forces necessary for the control of the displacement volume of a hydraulic axial piston unit, according to the invention, are generated directly at the working pistons, and do not have to go—as it is common state of the art—the long way via a mechanical or electric feedback of the real situation at the displacement element to a control unit and back from the control unit via the servo unit and the displacement element onto the working pistons. This reduction of response time is especially preferred for load sensing applications, as, according to the invention the hydraulic signals and their signal distances can be reduced to a minimum. Furthermore hydraulic lines from the control unit to the servo unit and further on to the displacement element can be eliminated and substituted by electrical (signal) lines which allow a much faster signal transfer as hydraulic lines do.

At least a person skilled in the relevant art derives from the above also that the inventive idea is applicable to variable displacement volume hydraulic axial piston units showing one or two conveying directions, as well as to two-position hydraulic axial piston units and hydraulic axial piston units, too, having a fixed displacement volume, regardless if they are operated in pump or motor mode.

The inventive hydraulic fluid injection system is capable to equalize/dampen pressure peaks, in particular, e.g. when a cylinder block bore passes in its rotational movement from the low pressure port in the valve plate to the high pressure port. By doing this, noises, flow ripples and kit moments (as known by a person with ordinary skills in the relevant art these kit moments are also called tilting moments acting on the displacement element around the displacement element tilt axis, and are constituted by all the various pressure, mechanical, and elastic forces acting on the displacement element, here a swashplate) can be reduced significantly and efficiency as well as performance of the hydraulic axial piston unit can be maintained on a stable high level. By injecting a controlled amount of hydraulic fluid under a controlled injection pressure the bore pressure in cylinder bores can be controlled directly, which leads to a much smoother run of the rotational group, whereas simultaneously kit moments on the valve plate are reduced. With the inventive control device and control method pressure waves created immanently in hydraulic axial piston units due to their working principle can be reduced or compensated when a synchronized timing for injecting/draining of hydraulic fluid to reduce the wave amplitudes is applied. By means of the flexible timing provided by the inventive injection control device, those system immanent pressure wave can be counteracted adequately each time a cylinder bore passes a control port. By doing this resonance vibrations, in particular, enforced resonance vibrations can thus be dampened, thereby improving the running behaviour of the hydraulic axial piston unit. The inventive injection system injects directly into the cylinder bores, such that it is capable to smoothen or even suppress pressure waves, occurring in nearly all hydraulic axial piston units when a cylinder bore passes from the high pressure side to the low pressure side and vice versa. Here, the inventive direct injection system is able to smoothen the pressure transition between the two pressure levels by injecting a small amount of hydraulic fluid under injection pressure directly into the cylinder bore passing the control port, By doing this, kit moments are reduced also, which leads to a reduction of wear between the cylinder block and the valve plate, and therewith reduces leakages between the cylinder block and the valve plate. From the above—at least a person skilled in the art—derives that the inventive injectors can be used in parallel to commonly known servo units, too, in order to improve the running behaviour of such a hydraulic axial piston unit according to the state of the art.

For some embodiments the effects mentioned before can be enhanced by placing one or more further control ports and injection points on the circumference of the valve segment, e.g. between subdivided kidney-shaped inlet and outlet ports. This is preferred, e.g. with valve segments showing more than one kidney-shaped inlet and/or outlet port, i.e. when the inlet and or outlet kidneys are subdivided, as known in the art. In these cases a control port can be arranged between each and every sub-kidney with a corresponding hydraulic fluid injector, or respectively, a control line for draining hydraulic fluid from the passing cylinder bore. With such a plurality of more than two control ports distributed in circumferential direction on the valve segment the pressure profile in circumferential direction can be controlled to optimize the running behaviour of a hydraulic axial piston unit, especially as each injection point can be controlled individually in its injection timing, pressure level, injection start and end time, duration of injection and course of injection over the injection time interval.

The same operational benefits apply for constant units, and also for variable displacement volume hydraulic axial piston units showing one or two conveying directions. These operational benefits applies also for two-position hydraulic axial piston units equipped with the inventive hydraulic fluid injection system, when their operational conditions are to be maintained constant, e.g. for automatic drive or load-sensing control.

Following the before mentioned applicability of the inventive hydraulic fluid injection system, having at least one injector located at one of the two control ports on the valve segment, in a further implementation/embodiment of the invention, hydraulic fluid under injection pressure can be injected alternatively also via the second control port into a respective cylinder bore passing this control port. This may be achieved by arranging one single injector with two lines, each line connecting one control port. By means of providing a switching valve the possibility to alternatively injecting hydraulic fluid into one or the other control port can be achieved, depending on the operational conditions/mode of the hydraulic axial piston unit.

In implementation of the inventive idea it may be preferred to use a separate injector for each control port. Thereby the use of two or more injector lines or two or more separate injectors for each control port is not limited to hydraulic axial piston units showing two conveying directions, since it is also applicable and useful for hydraulic axial piston units having only one conveying direction. Thereby it is understood that every hydraulic unit can be operated in pumping as well as in motoring mode. For instance for hydraulic axial piston units of the two-position type of construction, a switching from one position to the other position can be executed simply by changing the control port into which hydraulic fluid is injected. This can be done by selecting one or more of the injection lines or one or more of the injectors, depending on the embodiment implemented.

In all cases hydraulic fluid has to be drained from the respective other control port into which hydraulic fluid is not injected. Disregarding compressibility and leakage losses, the drained amount of hydraulic fluid is more or less equal to the amount of hydraulic fluid injected via the other (injecting) control port. Thereby it is preferred by the invention that the amount of hydraulic fluid injected to one of the two control ports is controlled by an electronic control unit. Such an electronic control unit, e.g., is capable to control the point of time, when injection should be started and stopped, the injection duration time, the frequency of injecting, the injection pressure, and the amount of hydraulic fluid to be injected. Further, such an electronic control unit is capable, e.g., to control also the course of injection, i.e. the variation of the injection parameters (e.g. time, duration, frequency, pressure level, amount, pressure gain/loss, etc.) over time course, e.g., the gain or slope of injection pressure over injection time.

As hydraulic units usually are driven at different revolutions speeds, the time for injecting hydraulic fluid through one control port depends also on the revolution speed. In general the higher the revolution speed the shorter the possible injection time window. This, however, can be controlled for instance by an electronic control unit which, for instance, comprises a microcontroller to process correspondent sensor or other command signals to trigger the injectors and/or the draining valves. The implementation of such an electronic control unit is within the general knowledge of a person skilled in the relevant art and thus covered by the inventive idea.

Even though a mechanical control of the injectors is imaginable, it is preferred according to the invention, that the injectors are controlled electronically. This provides for a greater flexibility in the way of controlling of the injectors with respect to the point of time, duration of injection, pressure and the amount of hydraulic fluid to be injected. Another positive point for electronic control lies in that the start point as well as the end point of injection can be adapted/selected according to operational parameters of the hydraulic axial piston unit to be controlled. Further, the ramp/slope of pressure gain and decent at the beginning and end of injection can be controlled electronically in a more variable manner, e.g. according to operational conditions. Thereby the cylinder bore pressure in the cylinder bores can be adjusted beneficially for an optimised running. For instance, the different driving modes of a hydrostatic driven vehicle, e.g. comfort, sport, economic load depending modes can be realised/set by electronically controlling the injection point of times as well as by setting the injection pressure and amount of hydraulic fluid in correlation to the ramp of pressure gain up to a maximum injection pressure. All this leads to on-stroke or de-stroke the hydraulic axial piston unit in the inventive controlled manner. At least for a person with relevant skills in the art it is obvious that such a direct and quick control of the displacement volume and the improvements of the operational parameters adaptable to each operational condition is not executable with common servo units used in hydraulic axial piston unit of the state of the art in a cost effective way. Traditional valve plates comprise fixed borders for the kidney-shaped inlet and outlet ports which are impossible to change on the fly, i.e. which are adaptable to varying working conditions. The inventive concept, however, provides for variable lengths of these kidney-shaped inlet and outlet port as the control ports can be seen as a kind of enlargement of these kidney-shaped inlet and outlet ports, and furthermore, as explained above timing of injection and drainage can be set flexible during operation of the hydraulic axial piston unit, the length of the inlet and outlet port can be adapted flexibly on the fly to the operational conditions of the hydraulic axial piston unit. Depending on the inventive control applied to the hydraulic axial piston unit each control port located on the valve plate can be seen as extension of the inlet or outlet port.

For enabling a good control of the operational parameters of an inventive hydraulic axial piston unit, it is preferred to use different kinds of sensors at determined locations within the hydraulic system, in particular in hydraulic propel applications or work function applications. Here, any kind of sensor known in the art can be applied; mere exemplarily: tilt angle sensors, shaft position sensors, pressure sensors, flow sensors, rotational speed sensors, temperature sensors, direction sensors and torque sensors are named to monitor the operational parameters of a hydraulic system. The signals of these sensors can be transmitted and processed by the electronic control unit in order to control/command the inventive injectors/injection system comprising at least one hydraulic fluid injector. By implanting the inventive control system a better automotive control for a hydraulic axial piston unit or a hydraulic propel system, e.g. can be achieved. Also load sensing control can be easier implemented as a more flexible control on the fly is possible. Such that cruise control, e.g., will be more sensible when using the inventive control system and method.

By means of the inventive injection system for hydraulic axial piston units a new control system for hydraulic axial piston units is provided, which provides a more direct and quicker control system for controlling the displacement volume of a hydraulic axial piston unit. The inventive injection system provides also for a more efficient, wear-reduced and smoother operation of the hydraulic unit. Especially in hydraulic propel applications such a direct cylinder bore pressure control can control/adjust the displacement settings and the operation efficiency of hydraulic axial piston units leading to a longer life span of the used hydraulic units. The same applies to the injectors they are comprised of a relatively low amount of parts compared to a servo system or servo unit in state of the art applications. Further, the inventive injection system for controlling hydraulic axial piston units is cost effective and robust at the same time, furthermore providing very high responsiveness.

In an embodiment it is imaginable that a pre-adjustment/first setting of a variable displacement hydraulic axial piston unit can be done as commonly known from the state of the art by means of a servo unit. Then, the inventive hydraulic fluid injection system can be used for (fine) tuning of the hydraulic axial piston unit. This fine tuning can be seen also as a kind of override control for improving operational conditions explained above for constant displacement volume operational conditions. This optimization of operational conditions leads to a reduction of noises, flow ripples, kit moments and leakage between the cylinder block and the valve plate, and leads therefore to a more efficient running of the hydraulic unit, leading further to a longer life span of the hydrostatic unit. Hence, with the inventive hydraulic unit comprises a fluid injection system, not only an effective control system for adjusting the displacement volume of a hydraulic axial piston unit is achieved, since also an effective optimization system for already existing hydraulic axial piston units can be provided. This means, that the inventive hydraulic fluid injection system can be installed/refitted to already existing hydraulic units in order to improve their performance.

BRIEF DESCRIPTION OF THE DRAWINGS

In the following and by the help of the attached Figures, preferred embodiments of the inventive injection system for the controlling of hydraulic axial piston units are shown exemplarily. How-ever, the invention is not limited to the embodiments shown below. Further—even if not described—different embodiments can be combined or modified within the capabilities of a person with ordinary skills in the art, and without leaving the scope of the inventive idea. The Figures show.

DETAILED DESCRIPTION

Figure 1:
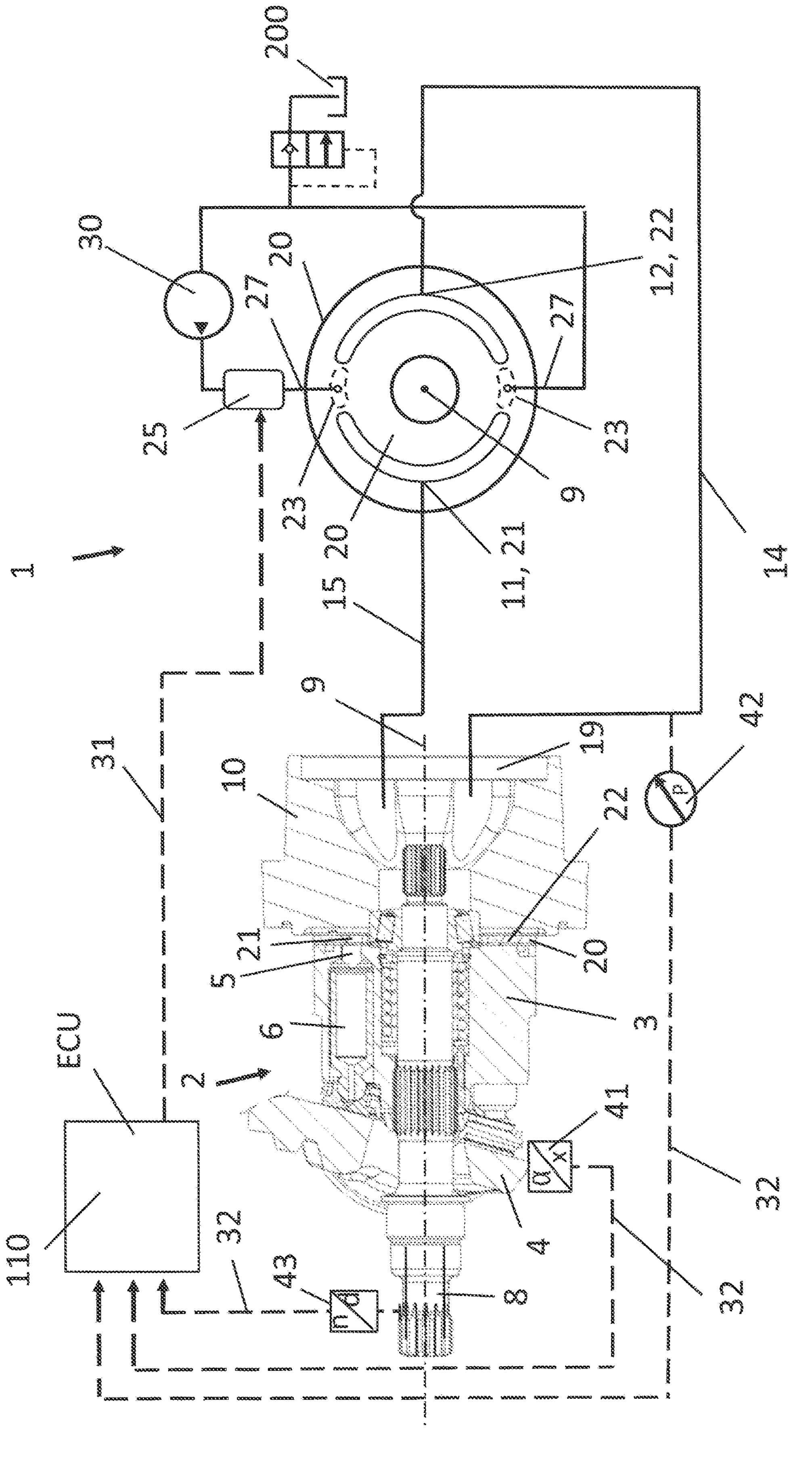
FIG. 1 is a basic embodiment of the inventive in a schematic view.

FIG. 1 shows a basic embodiment of the inventive injection system for hydraulic axial piston pumps. The hydraulic axial piston pump 1, shown in FIG. 1, is, mere exemplarily, a hydraulic axial piston pump of the swashplate type of construction. The hydraulic axial piston pump 1 comprises a casing 10 in which a rotational group 2 is housed for driving or being driven by a driving shaft 8. The driving shaft 8 is rotationally fixed to a cylinder block 3. Within the rotational cylinder block 3 working pistons 6 are distributed circumferentially in cylinder bores 5 around the axis 9 of the driving shaft 8. By means of the settable tilt angle of the axis of the swashplate 4 with respect to the axis 9 the stroke of working pistons 6 can be set/adjusted, i.e. controlled, and thereby the displacement volume of the hydraulic axial piston unit 1. At the opposite end of cylinder block 3 at the bottom end of cylinder block 3, a valve plate 20 is located with its correspondent kidney-shaped inlet port 21 and kidney-shaped outlet port 22. In this embodiment according to the invention the valve segment 20 is realised as a separate valve plate 20 located between the cylinder block 3 and the casing 10 which is closed by an end cap 19. A skilled person knows that the valve plate 20 can also be an integral part of the housing 10, or in other embodiments this hydraulic fluid conducting part of the housing 10 can be configured like an end cap 19 showing the valve plate functionality. All these and similar embodiments are covered by the invention and denominated as valve segment 20 on which the kidney-shaped inlet and outlet ports (21, 22) as well as the control ports (23) are located.

The exemplarily hydraulic axial piston pump shown in FIG. 1 can be easily operated as a hydraulic axial piston motor just by changing the inlet port with the outlet port, as it is well known by a person skilled in the art. The same applies to the application of the invention to other axial piston units which are known in the art.

Figure 2:
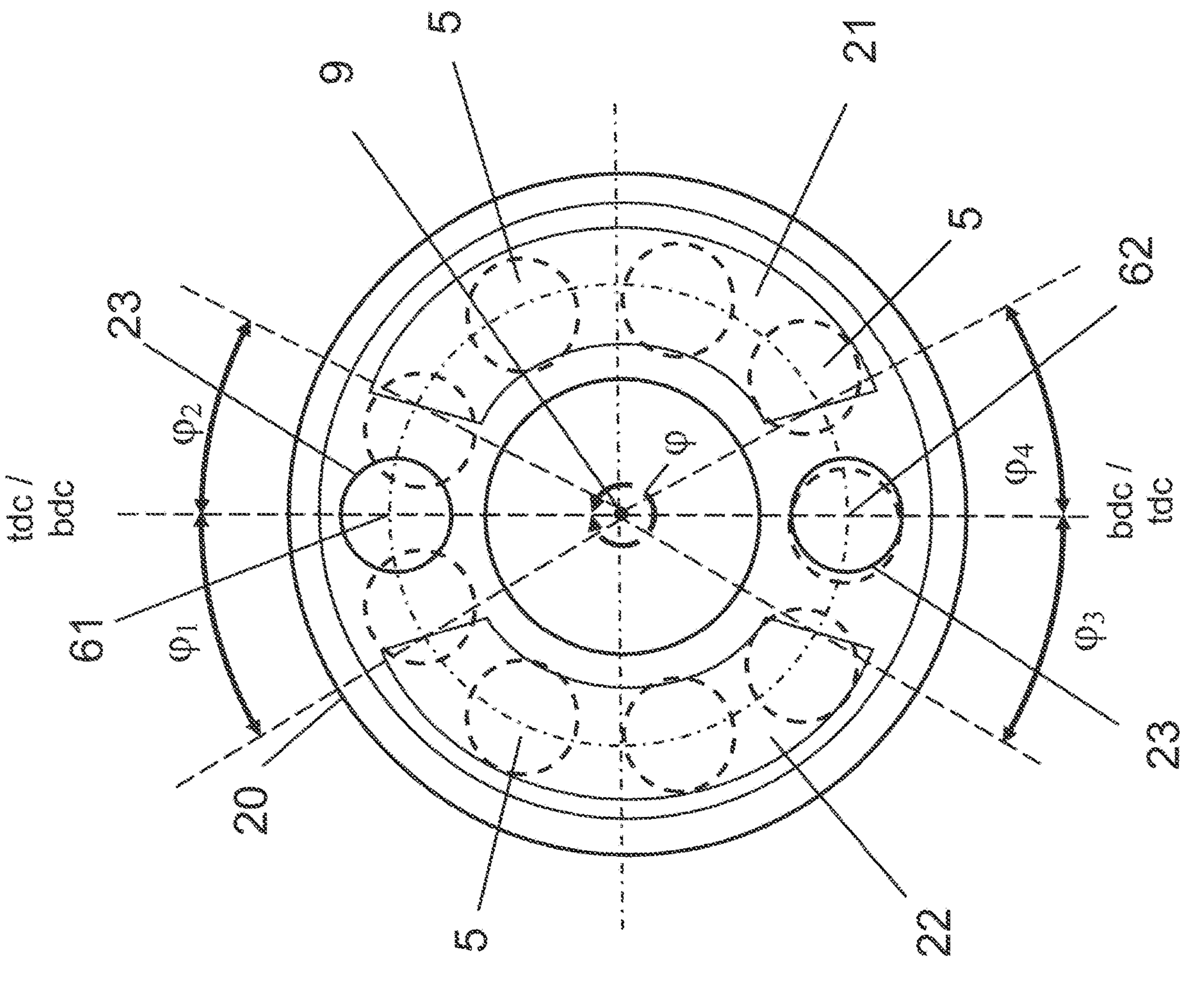
FIG. 2 is a schematic plane view of a valve plate.

For explanatory purposes only, the valve plate 20 is shown again on the right side of FIG. 1, and is also shown in FIG. 2 as a more detailed plane view. Here the kidney-shaped inlet port 21 as well as the kidney-shaped outlet port 22, can be identified as inlet, respectively as outlet port for conveying hydraulic fluid via the high pressure line 14 and low pressure line 15. Needless to say for a skilled person, that the inlet port 21 is interchangeable with the outlet port 22 as well as high pressure line 14 is interchangeable with low pressure line 15. This depends on the operational purpose for which the hydraulic axial piston unit 1 is provided for. Between the two kidney-shaped ports 21 and 22, control ports 23 are arranged.

In this exemplary embodiment, a control port 23 is connected via a control line 27 with an injector 25 for injecting hydraulic fluid under injection pressure at the (upper) control port 23 into the passing cylinder bore 5. A further control line 27 is connected to the other control port 23 for draining hydraulic fluid from the passing cylinder bore 5 towards a high pressure pump 30, e.g. or to an area of the hydraulic axial piston unit 1 where low pressure is present, e.g. a tank 200 or to casing 10. In this embodiment the injection pressure higher than the pressure present in the cylinder bore 5 which can be injected via the upper control port 23 into a cylinder bore 5 is provided by a high pressure pump 30 which is arranged in a closed circuit connecting the upper control port 23 with the lower control port 23. A skilled person will consider without difficulties that the high pressure pump 30 can be operated in an open circuit as well, and that the draining control line 27 can drain hydraulic fluid directly to casing 10 or to a tank 200, from which high pressure pump 30 can suck hydraulic fluid for pressurization.

It can be seen also from FIG. 1 that, in case, when hydraulic fluid under injection pressure is injected via the upper control port 23 into the cylinder bore 5, the corresponding working piston 6 will be moved towards the swashplate 4, so that the angle of tilt of the swashplate 4 will be reduced. At the same time the working piston 6 at the other dead centre (here the bottom dead centre) facing the other control port 23 will be moved further towards the inside of its correspondent cylinder bore 5. Consequently the upper dead centre (the most internal position of working piston 6) is moved/adjusted in the same amount, however in the opposite direction as the lower dead centre of the working piston 6 in cylinder bore 5. With changing the angle of tilt of the swashplate 4, both stroke limits of the working pistons 6 are changed and the displacement volume of the hydraulic axial piston pump 1 is reduced thereby.

The hydraulic axial piston unit 1 shown in FIG. 1 is at its maximum displacement volume, i.e. showing the maximum angle of tilt. This tilt angle can be changed by injecting hydraulic fluid via the lower control port 23 as described above. However, in particular, for hydraulic axial piston units having two conveying directions, the initial position of such a hydraulic unit would be normally at a tilt angle equal to zero; this means that the displacement volume is zero as the stroke of the working pistons 6 is zero also. From this zero-angle position it is imaginable, at least for a skilled person that any change of the swashplate angle can be performed either by injecting hydraulic fluid via one of the two control ports 23. When injecting hydraulic fluid via one of the two control ports 23 into one correspondent cylinder bore 5, the same volume is displaced via the other control port 23, as the displacement element—here the swashplate 4—is tilted out of its neutral position. Thereby the injection pressure and amount of hydraulic fluid is controlled by an electronic control unit (ECU) having a microcontroller 110. By means of the exemplarily shown speed sensor 43, angle sensor 41 and pressure sensor 42 the main operational parameters can be monitored. The sensor signals are transmitted to the ECU by means of signal lines 31. Correspondingly via signal line 31, e.g., electronic signals processed by the ECU as commands for injecting hydraulic fluid are guided—in this embodiment—to injector 25 in order to achieve the inventive control of the displacement volume by means of injection of hydraulic fluid in the passing cylinder bore 5 (see also FIG. 2).

FIG. 2 shows schematically a valve plate 20 in concept of an example for a valve segment 20 according to the invention. Here the kidney-shaped inlet port 21, the kidney-shaped outlet port 22, and the control ports 23 are depicted in solid lines, wherein the cylinder bores 5 rotating during operation of the hydraulic axial piston unit 1 around rotational axis 9 are depicted in dashed lines. As can be seen from FIG. 2 the two control ports 23 are located on the valve segment (here valve plate 20) between the circumferential end of the kidney-shaped inlet and outlet ports 21 and 22. With reference numbers 61 and 62 the respective dead end positions of the working pistons 6 are indicated regarding its location with regard to the angle of rotation cp. Even though the control ports 23 in FIG. 2 are shown as circular bores, the invention covers also to realise them with an elongated section or kidney-shaped section as shown, e.g., in FIG. 1. Further, the circumferential ends of the kidney-shaped inlet and outlet ports 21 and 22 and/or the control ports 23 can show any suitable shape or distance between them in order to provide an optimised functioning for the inventive idea. By means of timely variable injecting pressurized hydraulic fluid via one control port 23 and draining hydraulic fluid via the other control port 23 a kind of flexible extension of the kidney-shaped inlet and outlet port is performed depending on the time point of injection chosen. A person with relevant skills in the art will recognise that the time point for injecting or draining of hydraulic fluid from the control ports 23 before or after the respective dead centre will influence the displacement volume of the hydraulic axial piston unit and will on-stroke or de-stroke it.

FIGS. 3*a* to 3*d* show bore-pressure over rotation-angle diagrams in which the bore pressure course is shown exemplarily for different operational situations and purposes. From these diagrams it can be seen that the starting points for injecting as well as the end points to stop injection into one single cylinder bore 5 passing one of the control ports can be selected flexibly corresponding to the operational requirements. This can be done especially by an electronic control unit having a microcontroller 110, e.g. Further it can be seen from the diagrams of FIGS. 3*a* to 3*d* that also the gain in pressure inside the cylinder bore 5 can be controlled with the inventive hydraulic fluid injection system when using an appropriate electronic control unit.

Figure 3A:
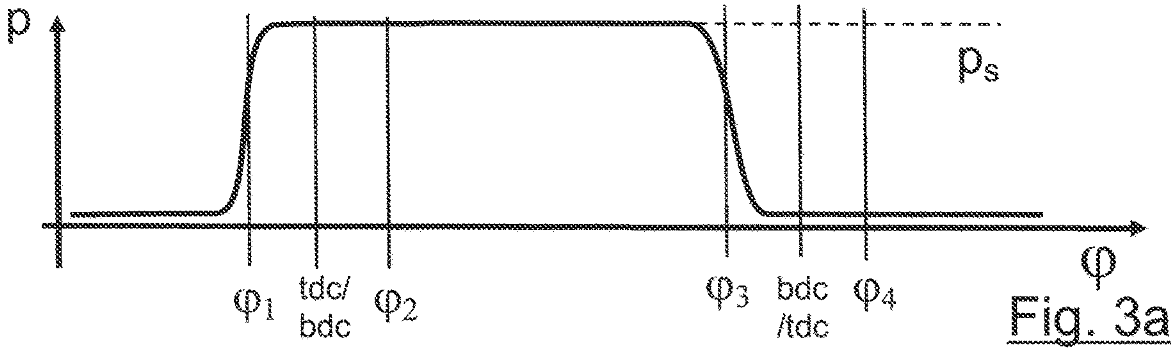
FIGS. 3*a* to 3*d* are examples for injection pressure-over-rotation-angle diagram(s)

FIG. 3*a* shows exemplarily a course of injection pressure for on-stroking, e.g. a hydraulic axial piston pump 1, i.e. increasing the strokes of the working pistons 6, as at least in one cylinder bore 5 at or after bottom dead centre (bdc) hydraulic fluid is injected, hence before this cylinder bore 5 enters at $\varphi_2$ in overlap with kidney-shaped inlet port 21. At the same time—even not shown in the diagram of FIG. 3*a*—the same amount of hydraulic fluid is drained from another cylinder bore 5 located in the area of rotation angle $\varphi_3$ and $\varphi_4$. Thus, the working piston 6 of the injected cylinder bore 5 is forced to displace its bottom dead centre (bdc) towards the inside of the cylinder block 3, thereby increasing the angle of tilt and increasing the displacement volume of the hydraulic axial piston unit 1.

Figure 3B:
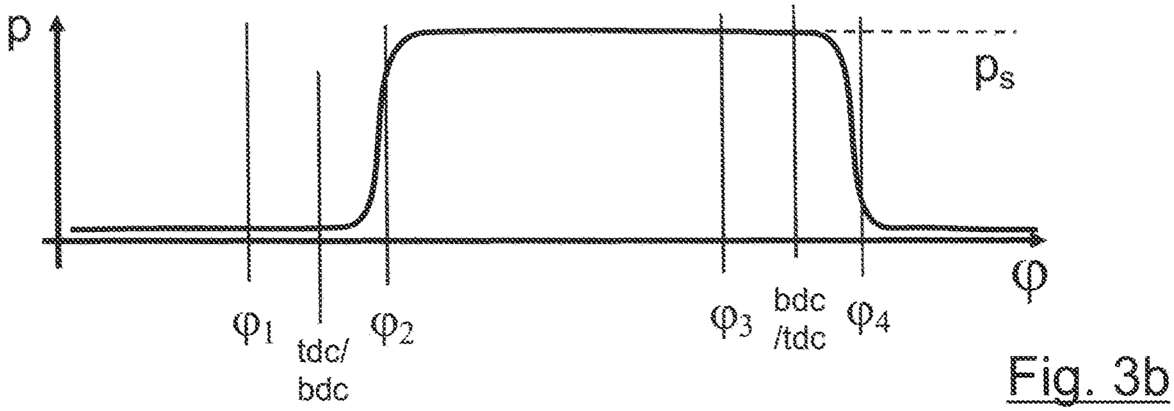

FIG. 3*b* show, mere exemplarily too, the injection pressure course for de-stroking the hydraulic axial piston pump 1, as at least in one cylinder bore 5 hydraulic fluid is injected after this cylinder bore 5 leaves at $\varphi_3$ its overlap with kidney-shaped outlet port 22, At the same time—even not shown in the diagram of FIG. 3*a*—the same amount of hydraulic fluid is drained from another cylinder bore 5 located in the area of rotation angle $\varphi_1$ and $\varphi_2$. Thus, the working piston 6 of the injected cylinder bore 5 is forced to displace its upper/top dead centre (tdc) towards the inside of the cylinder block 3, thereby reducing the angle of tilt and reducing the displacement volume of the hydraulic axial piston unit 1.

Figure 3C:
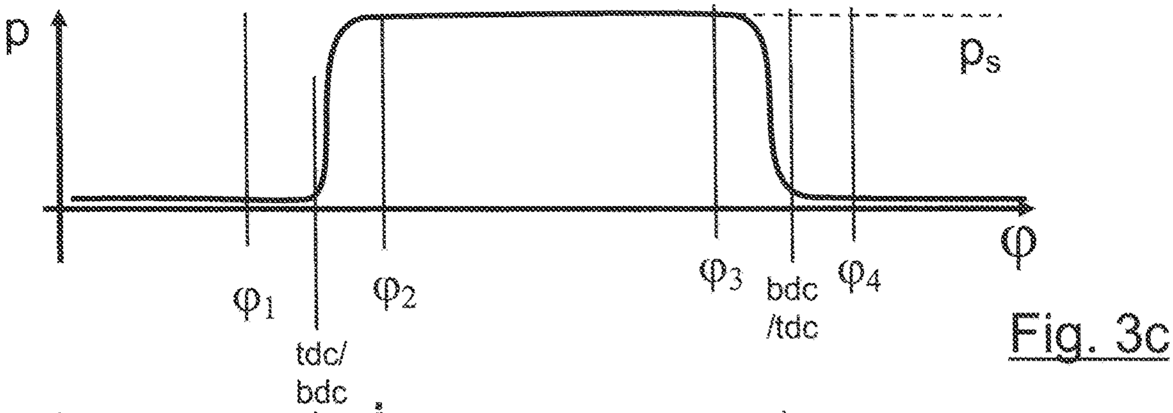
Figure 3D:
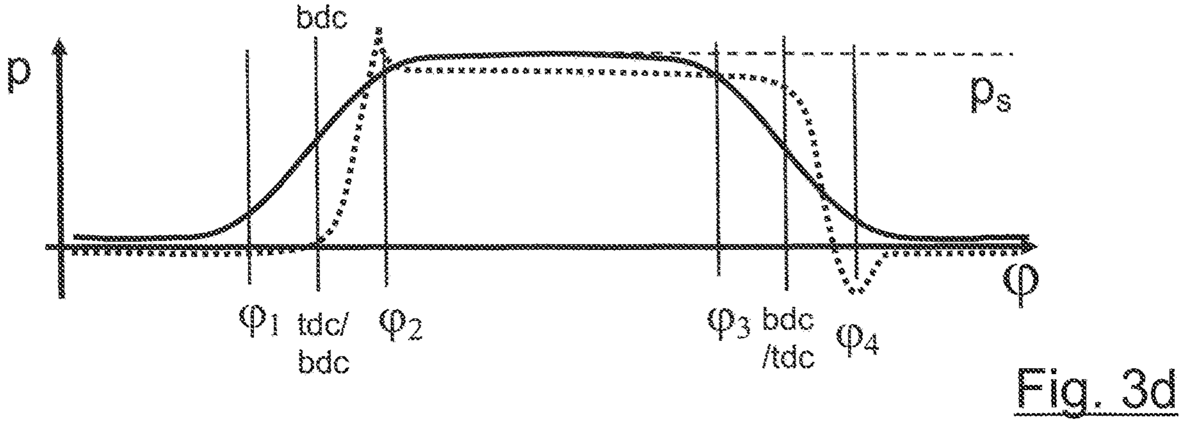

FIGS. 3*c* and 3*d* show a cylinder bore pressure profile over rotation angle for holding a hydraulic axial piston unit on stroke and compensate dynamic disturbances of the hydraulic axial piston pump 1. FIG. 3*c* is an example for low speed operational condition, and FIG. 3*d* shows an cylinder bore pressure profile over rotation angle (solid line) for holding on-stroke a high speed rotating rotational group avoiding thereby pressure peaks as these commonly occur in the state of the art. The dashed line in FIG. 3*d* indicates the correspondent cylinder bore pressure profile according to the state of the art showing these pressure peaks. By means of the inventive hydraulic fluid injection via at least one control port, these pressure peaks can be smoothened. A person with skills in the art also derives from these bore-pressure over rotation-angle diagrams that with adapting/controlling the timing of the injection pressure at the corresponding injection kit moments on the valve plate can be reduced significantly as big pressure differences/steps, especially between the low pressure kidney-port and the high pressure kidney-port can be damped/smoothened/equalized by the inventive hydraulic fluid injection into at least one control port 23 being in fluid communication with a cylinder bore 5.

Figure 4:
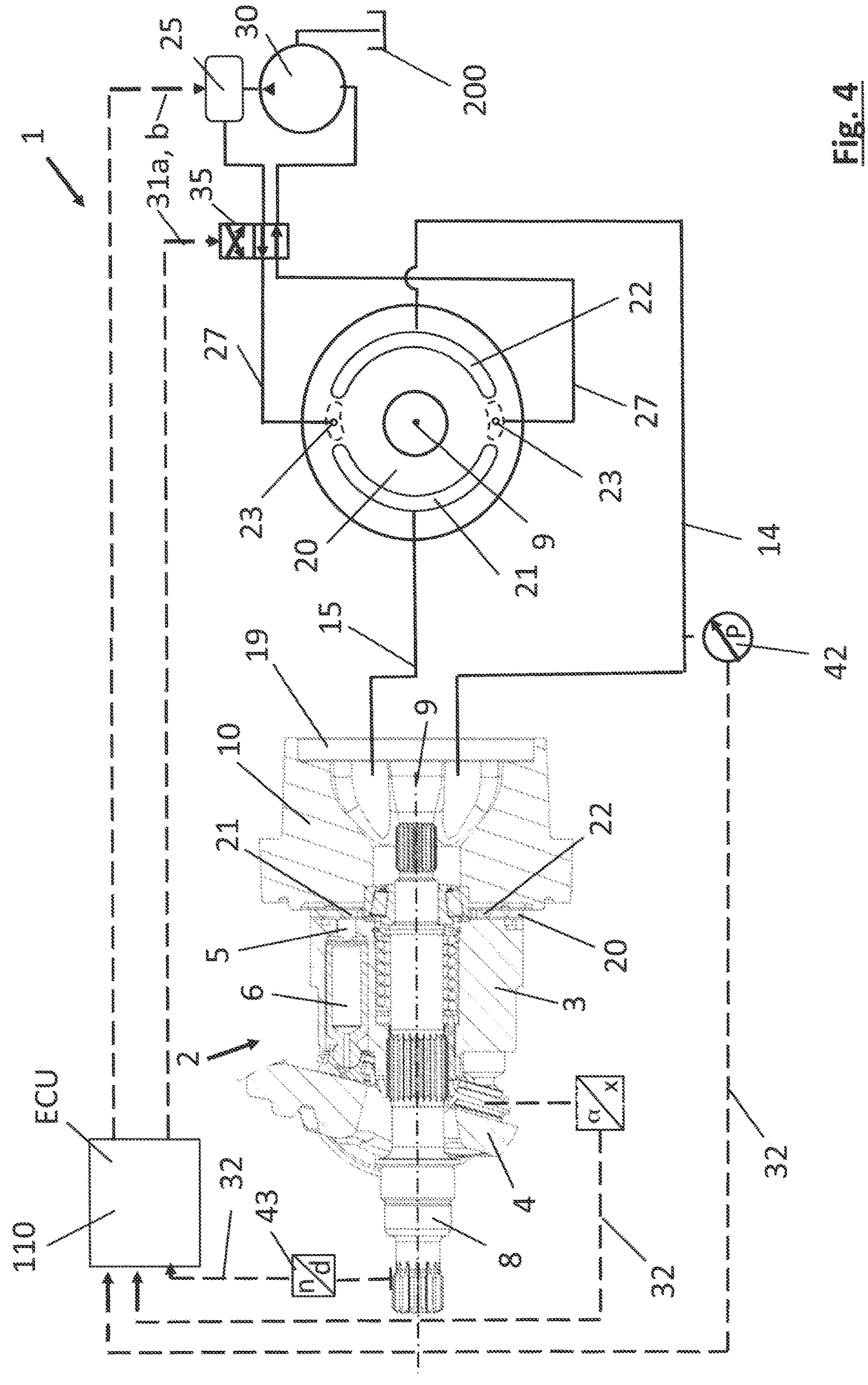
FIG. 4 is a second embodiment of the inventive injection system.

FIG. 4 shows an inventive hydraulic unit 1 in a further embodiment of the inventive injection system. In this embodiment only one injector 25 is used in combination with a switching valve 35 enabling the possibility of alternative injection of pressurized hydraulic fluid to one of the two control ports 23. In the situation of the switching valve 35 depicted in FIG. 4 the upper control port 23 is the injection port and the lower control port 23 is the draining port from which hydraulic fluid is drained to the high pressure pump 30. Hence, as it can be derived further from FIG. 4, by means of switching the switching valve 35 into its second position, the injection port changes with the draining port. In this case only one signal line 31 from the electronic control unit to the injector 25 is necessary for controlling/monitoring the inventive hydraulic axial piston unit 1 in all operational conditions, i.e. to on-stroke or de-stroke or to change the direction of conveying or to improve the running characteristics of the hydraulic axial piston unit 1.

Figure 5:
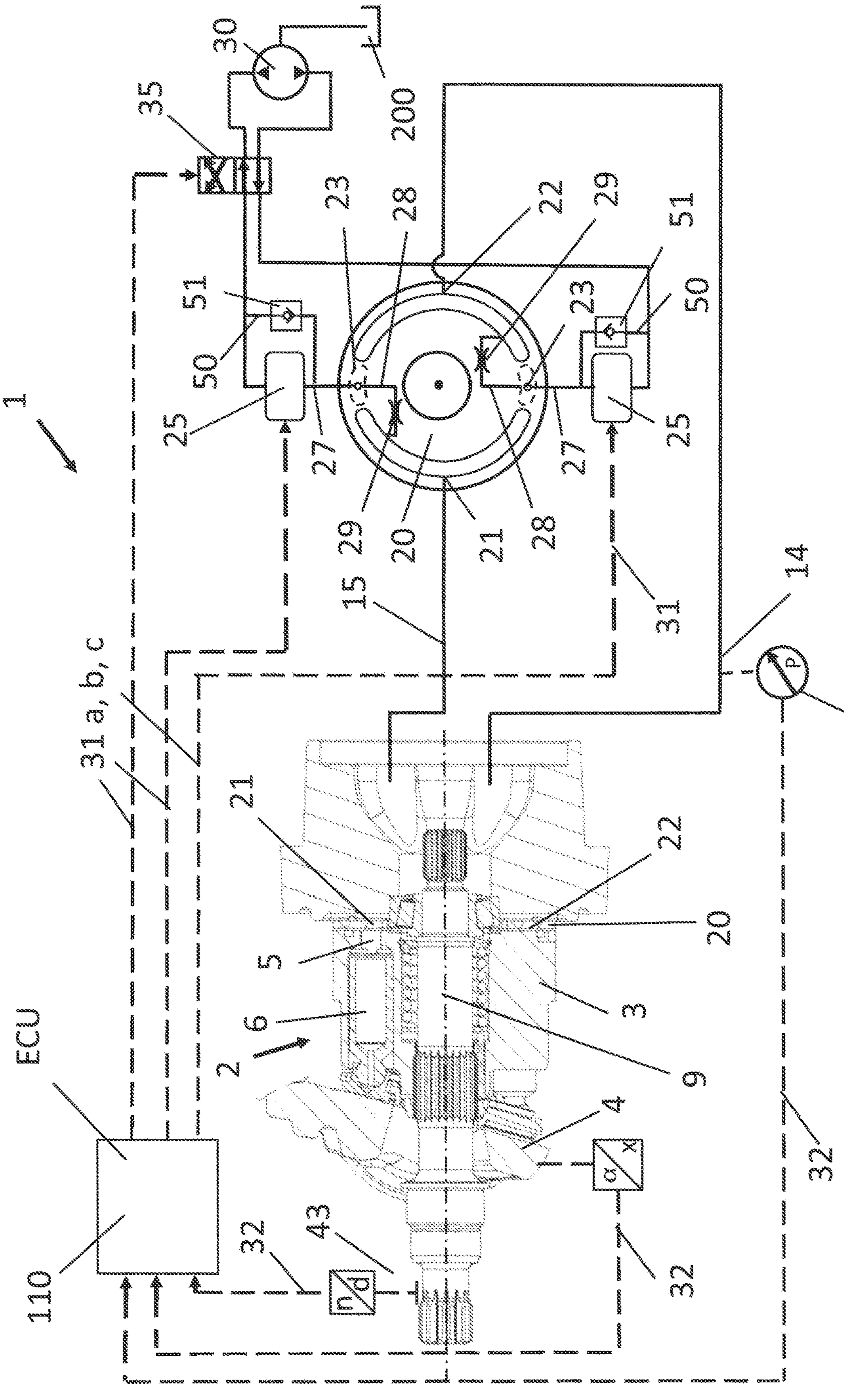
FIG. 5 is a third embodiment of the inventive injection system.

FIG. 5 further shows another optional embodiment for improving the running characteristics of the hydraulic axial piston unit 1 by connecting at least one of the control ports 23 with one of the beneath located kidney-shaped inlet or outlet port 21 or 22 upstream or downstream of the control port 23 by means of a bypass line 28 with an orifice 29 connected therein. A person skilled in the art detects that such an optional bypass line 28 with the therein located orifice 29 can be applied to all embodiment according to the invention and is not limit to the one shown in FIG. 5. By means of this bypass line 28 with the therein located orifice 29 the pressure raise or drop between the pressure level at the control port 23 to the pressure present in kidney-shaped inlet or outlet port 21 or 22 can be dampened or smoothened such that, for instance, pressure waves generated by big pressure differences are avoided or at least reduced in their magnitude.

For this exemplary inventive controlling of the hydraulic axial piston unit 1 two separate injectors 25 are provided, one for each control port 23. Accordingly, for each injector 25 a separate command line 31*b*, 31*c* from the electronic control unit 110 is provided for commanding the two injectors 25 independently. In FIG. 5 the high pressure pump 30 is capable to provide one of both injectors 25 with hydraulic fluid under injection pressure, wherein the respective other injector 25 is capable to guide drained hydraulic fluid to the entrance (input port) of high pressure pump 30. A person skilled in the art can modify the embodiment shown in FIG. 5 by adding a switching valve 35 as it is used for instance in the embodiment shown in FIG. 4 in order to avoid that high pressure pump 30 has to be changed in its conveying direction when switching from one injector 25 to the other is commanded by ECU 110. A person with skills in the relevant art, will detect easily a lot of other possibilities to select one or the other control line 27, in order to provide only one of the two injectors 25 with hydraulic fluid under injection pressure. Exemplarily draining lines 50 bypass the hydraulic fluid injectors 25, In each draining line 50 a check valve 51 is located in order to drain hydraulic fluid from the control port 23 which is not the hydraulic fluid injection control port; i.e. the draining control port. These draining lines 50 with its respective check valves 51 are not mandatory and depends, e.g. from the type of injectors used in implementation of the inventive hydraulic fluid injection control system.

Figure 6:
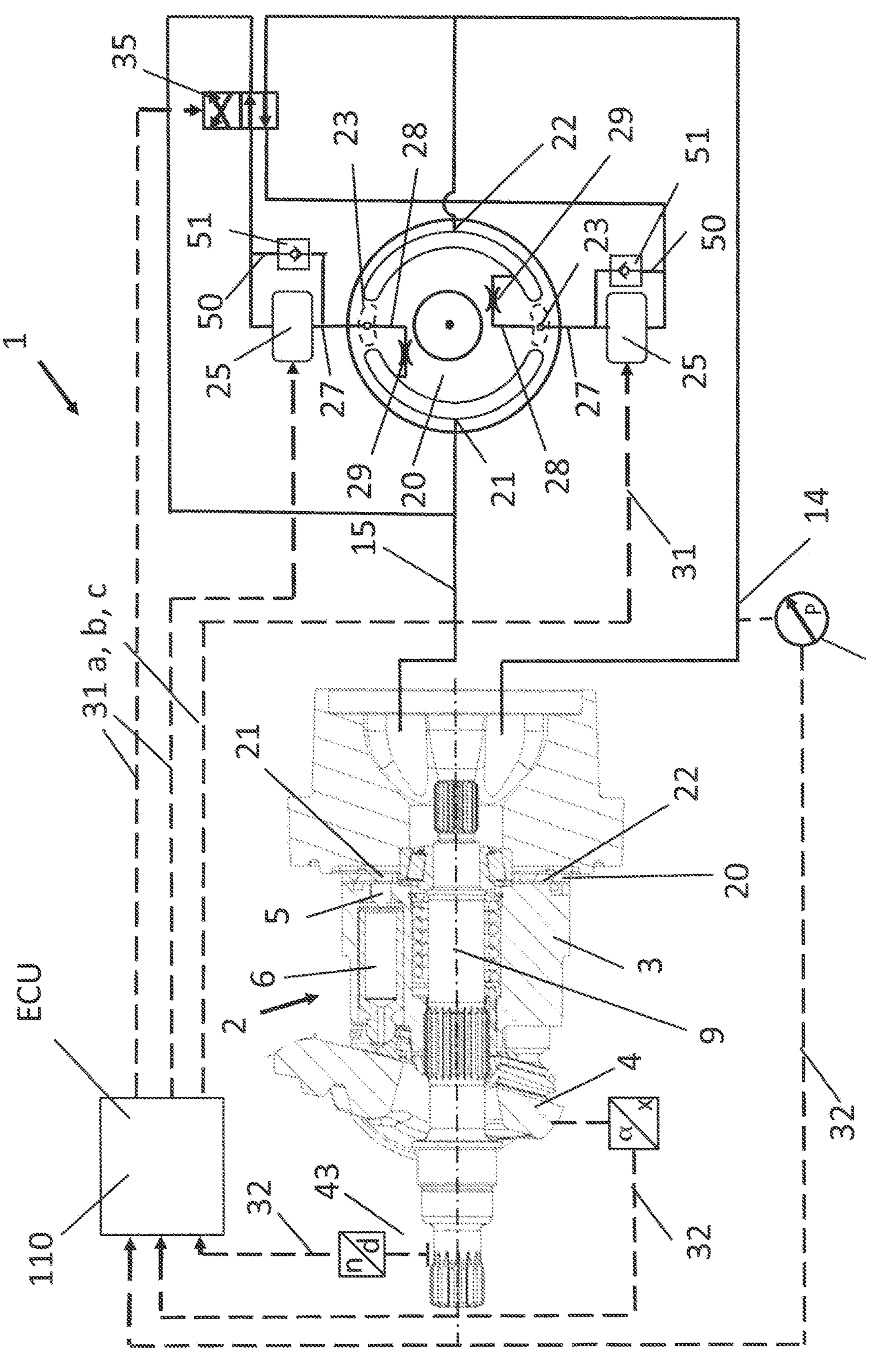
FIG. 6 is a forth embodiment of the inventive injection system.

A further embodiment of the inventive hydraulic axial piston unit with an inventive injection system is depicted in FIG. 6. The embodiment of FIG. 6 for an inventive injection system differs from the embodiment of FIG. 5 as it uses the system/working pressure as source for the injection pressure, and do not comprise a high pressure pump 30. Accordingly the two injectors 25 are connected via a switching valve 35 with the two kidney-shaped ports 21 and 22 such that both injectors 25 are capable to alternatively inject or drain hydraulic fluid from the control port 23 to which the injector 25 is assigned to. Thereby injection pressure is supplied by the high pressure kidney-shaped port 21 or 22 to one of the two injectors 25, and hydraulic fluid drained from the other injector 25 is guided to the correspondent other low pressure kidney-shaped port 22 or 21.

Figure 7:
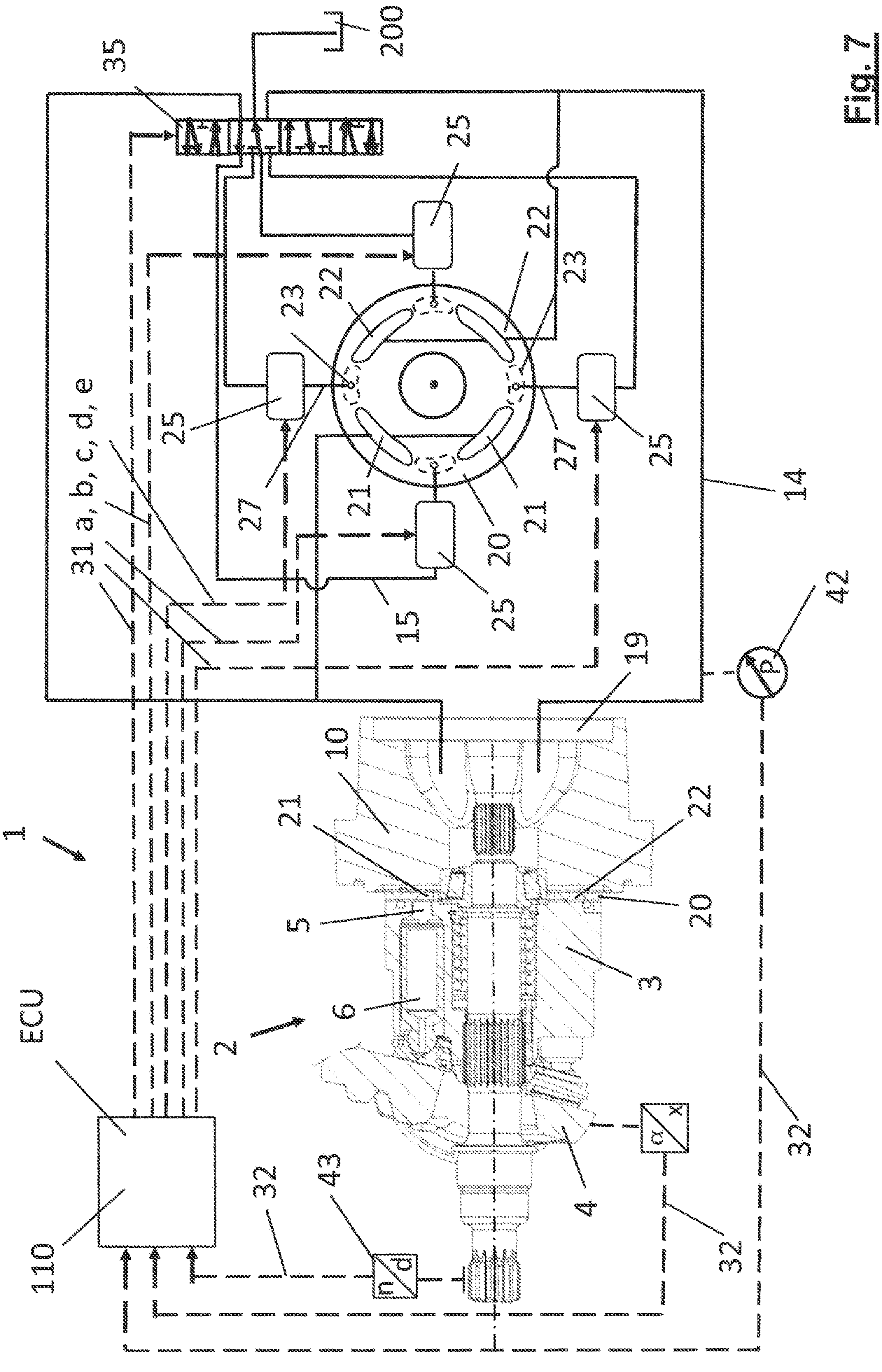
FIG. 7 is a sixth embodiment of the inventive injection system.

With FIG. 7 another example for the implementation of the inventive hydraulic fluid injection controlled hydraulic axial piston unit 1 is shown, which is based on the embodiment of FIG. 5. In this embodiment according to FIG. 6 two more control ports 23 with correspondent hydraulic fluid injectors 25 are located spaced at approximately 90° to each other. The kidney-shaped inlet and outlet ports 21 and 22 are each divided into 2 sub-kidneys. By means of these two additional hydraulic fluid injection locations the cylinder bore pressure profile over the whole circumference of the valve segment 20, here again a valve plate 20 can be controlled at more points in order to reduce kit moments and optimize the running of the hydraulic axial piston unit 1. Following the example shown with FIG. 7 a skilled person derives that also a plurality of more than four hydraulic fluid injectors 25 can be placed on the valve segment 20 in the areas between two partial kidney-shaped inlet and outlet ports 21 and 22 in order to get an even more precise control of the circumferential cylinder bore pressure profile of the hydraulic axial piston unit 1.

Figure 8:
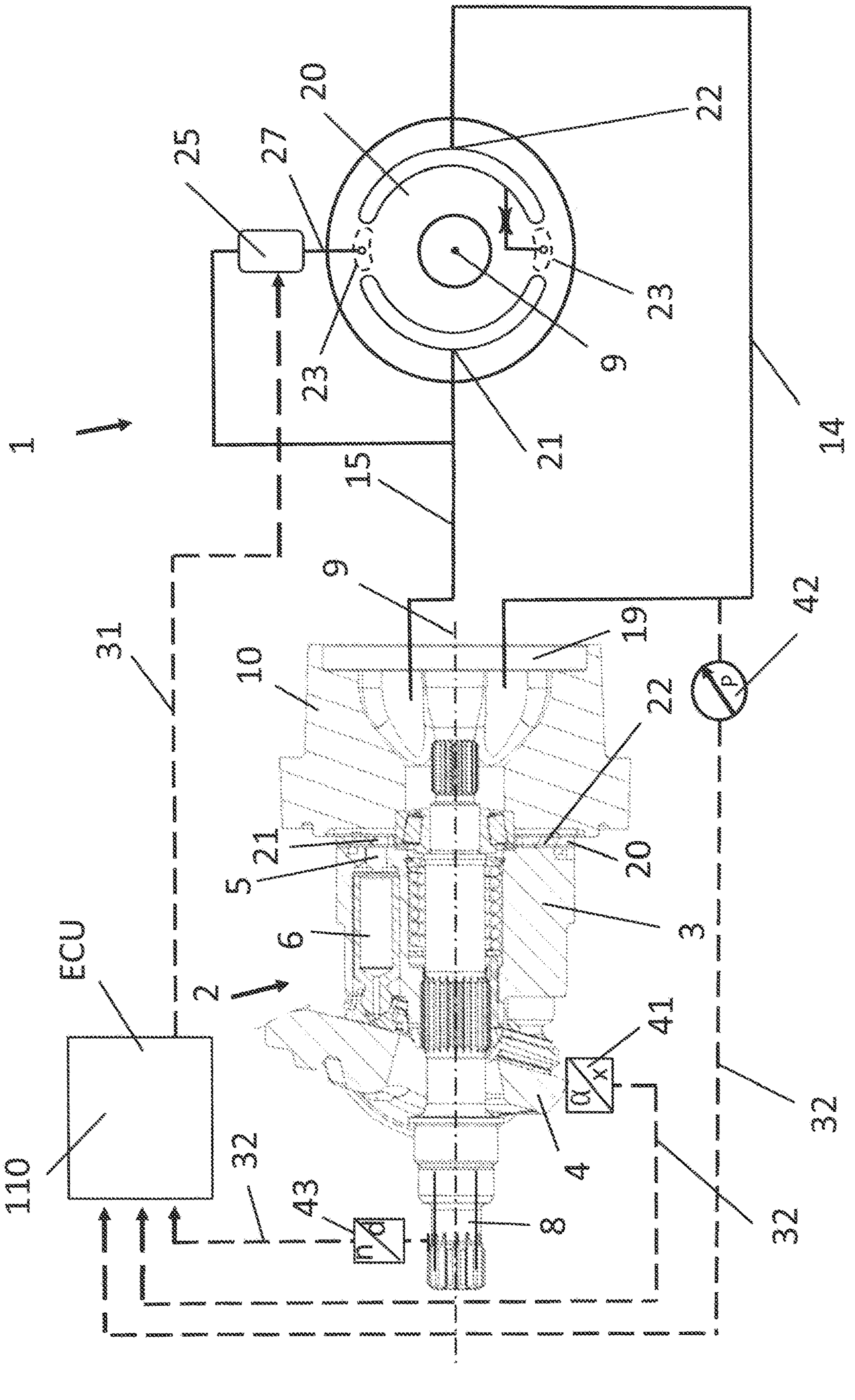
FIG. 8 is a seventh embodiment of the inventive injection system.

Another part-reduced implementation of the inventive injection system is shown with FIG. 8 in which a hydraulic fluid injector (25) is used which is capable to use the pressure level supplied directly via the systems high pressure lines 14. In this embodiment draining of hydraulic fluid from the non-injection control port 23 is possible via a bypass line 28 and an orifice 29 located in the bypass line 28, wherein the bypass line 28 is connected to the low pressure kidney-shaped port. This bypass line 28/orifice 29 combination can be realized as a kind of notch in the valve segment 20, for instance.

Furthermore, a person with skills in the relevant art will detect many more possibilities to optimize the run and adjustment of hydraulic units by manipulating the injection parameters like injection time, gain/decent of injection pressure (bore pressure) over time and/or rotation angle, injection pressure, and/or amount of hydraulic fluid injected by one or more injectors in order to come to an improved control and running behaviour of an inventive hydraulic unit and the hydraulic system, in which the hydraulic unit is used. Hence, all these combinations and variations, which are within the possibilities of a person with relevant skills in the art, are covered by the inventive idea and therefore by the scope of the attached claims.

What is claimed is:

1. A hydraulic axial piston unit comprising:

a rotational group for driving or being driven by a driving shaft, and a tiltable displacement element for adjusting the displacement volume of the rotational group, wherein the rotational group comprises a rotatable cylinder block in which working pistons are mounted reciprocally moveable in cylinder bores for conveying hydraulic fluid from a kidney-shaped inlet port to a kidney-shaped outlet port located on a valve segment of the hydraulic axial piston unit, said hydraulic axial piston unit further comprising for the adjustment of the displacement volume:

at least two control ports each located on the valve segment between the respective circumferential ends of the kidney-shaped inlet port and the kidney-shaped outlet port, which control ports can be brought sequentially in fluid connection with the cylinder bores when the cylinder block rotates;

at least one hydraulic fluid injector connected fluidly to one control port, for injecting hydraulic fluid with a variably adjustable pressure level via one control port into passing cylinder bores during a time span when the cylinder bores at least partially overlaps with the control port, and at least one control line connected to the other control port, for draining hydraulic fluid from the passing cylinder bores, wherein the at least one hydraulic fluid injector is connected fluidly to both control ports via two control lines connected to a hydraulically, electro-mechanically or pneumatically operable two-position switching valve, wherein the switching valve selects in each position one of the two control lines for injecting of hydraulic fluid by means of the injector and the other control line of the two control lines for draining hydraulic fluid from the other control port.

2. The hydraulic axial piston unit according to claim 1, wherein the valve segment comprises more than one kidney-shaped inlet port and/or more than one kidney-shaped outlet port, wherein between the respective circumferential ends of each kidney-shaped inlet ports or kidney-shaped outlet ports, respectively, control ports are located for injecting hydraulic fluid by means of the at least one hydraulic fluid injector.

3. The hydraulic axial piston unit according to claim 1, wherein hydraulic fluid can be supplied to the at least one injector by means of a high pressure pump.

4. The hydraulic axial piston unit according to claim 3, wherein the hydraulic axial piston unit is used for a hydraulic system showing a closed hydraulic circuit, and wherein the high pressure pump is used in parallel as a charge pump for the hydraulic circuit.

5. The hydraulic axial piston unit according to claim 1, wherein at least one bypass line with an orifice located therein connects one control port of the at least two control ports with one of the kidney-shaped inlet port or the kidney-shaped outlet port upstream or downstream of the one control port.

6. The hydraulic axial piston unit according to claim 3, wherein the high pressure pump is a mechanically, hydraulically or electrically driven positive displacement pump of reciprocating or rotary construction.

7. The hydraulic axial piston unit according to claim 1, wherein the at least one hydraulic fluid injector can be actuated electro-mechanically, hydraulically or pneumatically.

8. The hydraulic axial piston unit according to claim 1, wherein the at least one hydraulic fluid injector is a quick reacting switching valve or a fuel injection.

9. The hydraulic axial piston unit according to claim 1, wherein the actuation of the at least one hydraulic fluid injector is controllable via an electronic control unit (ECU) comprising a microcontroller, and being connected to at least one sensor selected from a group of sensors comprising at least a tilt angle sensor, a shaft position sensor, a pressure sensor, a flow sensor, a rotational speed sensor, a temperature sensor, a direction sensor, a torque sensor, an acceleration sensor or any other sensor capable to monitor at least one operational parameter of the hydraulic unit.

10. The hydraulic axial piston unit according to claim 1, wherein the hydraulic piston unit is a hydraulic axial piston unit being adjustable to positive and/or negative tilt angles.

11. The hydraulic axial piston unit according to claim 1, wherein the hydraulic axial piston unit is useable in open or closed hydraulic circuits.

12. The hydraulic axial piston unit according to claim 1, wherein the at least one hydraulic fluid injector and/or a high pressure pump compensates leakages in a hydraulic working or propel application which is supplied with hydraulic fluid by the hydraulic axial piston unit.

13. A hydraulic system for a hydraulic propel application having at least one hydraulic axial piston unit according to claim 1.

14. A method for controlling the displacement volume of a hydraulic axial piston unit comprising:

a rotational group for driving or being driven by a driving shaft, and a displacement element tiltable for adjusting the displacement volume of the rotational group, wherein the rotational group comprises a rotatable cylinder block in which working pistons are mounted reciprocally moveable in cylinder bores for conveying hydraulic fluid from a kidney-shaped inlet port to a kidney-shaped outlet port located on a valve segment of the hydraulic axial piston unit, said hydraulic axial piston unit further comprising:

at least two control ports each located on the valve segment between the respective circumferential ends of the kidney-shaped inlet port and the kidney-shaped outlet port, wherein the control ports can be brought sequentially in fluid connection with the cylinder bores when the cylinder block rotates, wherein the at least one hydraulic fluid injector is connected fluidly to both control ports via two control lines connected to the outlets of a hydraulically, electro-mechanically or pneumatically operable two-position switching valve, wherein the switching valve selects in each position one of the two control lines for injecting of hydraulic fluid by means of the injector and the other control line of the two control lines for draining hydraulic fluid from the other control port, the method comprising the following steps:

injecting by means of a hydraulic fluid injector hydraulic fluid with a variably adjustable pressure level via one control port into passing cylinder bores during a time span when the cylinder bores at least partially overlaps with the control port, draining hydraulic fluid via the other control port from the passing cylinder bores.

15. The method according to claim 14, further comprising the step of:

processing commands of a control unit or an operator by means of an electronic control unit (ECU) having a microcontroller for adapting the timing and/or pressure and/or the amount of hydraulic fluid being injected via the first control port into the passing cylinder bores, in order to control the pressure in the cylinder bores for controlling the displacement volume of the hydraulic axial piston unit.

16. The method according to claim 14, further comprising the steps of:

sensing of at least one operational parameter of the hydraulic axial piston unit by means of a sensor selected from a group of sensors comprising at least a tilt angle sensor, a shaft position sensor, a pressure sensor, a flow sensor, a rotational speed sensor, a temperature sensor, a direction sensor, a torque sensor, an acceleration sensor or any other sensor capable to monitor at least one operational parameter of the hydraulic unit;

transmitting the sensed operational parameter to the electronic control unit (ECU);

processing the transmitted operational parameters for adapting the timing and/or pressure and/or the amount of hydraulic fluid for injecting via one of the first control port and draining from the other control port into/from the passing cylinder bores.

17. The method according to claim 16, further comprising the step of:

continuously monitoring the operational parameters of hydraulic axial piston unit in order to smoothen pressure steps between the kidney-shaped inlet port and the kidney-shaped outlet port and vice versa, and/or for controlling the pressure in the cylinder bores.

18. The method according to claim 14, further comprising the step of:

injecting hydraulic fluid via at least one additional control port located between the circumferential ends of a plurality of kidney-shaped inlet or outlet ports on the valve segment.

19. The method according to claim 14, further comprising the step of:

sensing a system pressure in working lines of the hydraulic axial piston unit for detecting pressure waves and peaks immanent to the operation of the hydraulic axial piston unit;

determining the timing of injection hydraulic fluid into the cylinder bores passing at least one control port such that system immanent waves and peaks in the system pressure are reduced, or even eliminated.

* * * * *